US008672700B2

(12) United States Patent
Matsumoto et al.

(10) Patent No.: US 8,672,700 B2
(45) Date of Patent: Mar. 18, 2014

(54) CONNECTOR ASSEMBLY

(75) Inventors: Mitsuhiro Matsumoto, Makinohara (JP); Hajime Kato, Makinohara (JP); Kouichi Nakayama, Makinohara (JP); Tsuyoshi Mizushima, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/321,879

(22) PCT Filed: Nov. 30, 2010

(86) PCT No.: PCT/JP2010/071780
§ 371 (c)(1),
(2), (4) Date: Nov. 22, 2011

(87) PCT Pub. No.: WO2011/070993
PCT Pub. Date: Jun. 16, 2011

(65) Prior Publication Data
US 2012/0238147 A1   Sep. 20, 2012

(30) Foreign Application Priority Data
Dec. 10, 2009  (JP) ................... 2009-280228

(51) Int. Cl.
*H01R 13/627* (2006.01)

(52) U.S. Cl.
USPC ........................................................ 439/364

(58) Field of Classification Search
USPC ..................... 439/359, 361, 362, 363, 364
See application file for complete search history.

(56) References Cited

U.S. PATENT DOCUMENTS

| 5,197,903 A * | 3/1993 | Casey et al. ................ 439/564 |
| 5,580,286 A * | 12/1996 | Kramer et al. ............... 439/813 |
| 6,056,592 A | 5/2000 | Hashizawa et al. |
| 6,464,538 B2 * | 10/2002 | Miyazaki et al. .......... 439/607.44 |
| 6,583,352 B2 * | 6/2003 | Fukushima et al. ............ 174/373 |

(Continued)

FOREIGN PATENT DOCUMENTS

| JP | 169136-1985 | 5/1987 |
| JP | 11-126661 A | 5/1999 |

(Continued)

OTHER PUBLICATIONS

International Search Report and Written Opinion for PCT /JP2010/071780 issued Dec. 28, 2010.

(Continued)

*Primary Examiner* — Ross Gushi
(74) *Attorney, Agent, or Firm* — Edwards Wildman Palmer LLP

(57) ABSTRACT

The present invention provides a connector assembly allowing attachment of a connector to a connector receptacle with a limited attachment space. The connector assembly includes the connector having a terminal and a connector housing, the connector receptacle having a case and a terminal portion, and a fastening member. The terminal has an electrical contact portion with a hole. The connector housing has a column portion for receiving the electrical contact portion with the hole aligned in an insertion direction of the connector. The terminal portion has a connection portion to be superposed with the electrical contact portion and has a second hole to be communicated with the hole. The case has a housing portion for supporting the connection portion so that the second hole of the connection portion is aligned with the insertion direction of the connector. The electrical contact portion and the connection portion are fastened together with the fastening member passed through the communicated hole and the second hole.

8 Claims, 8 Drawing Sheets

(56) References Cited

U.S. PATENT DOCUMENTS

| | | | |
|---|---|---|---|
| 6,695,632 B2 * | 2/2004 | Matsumoto et al. | 439/246 |
| 6,716,071 B2 * | 4/2004 | Miyazaki | 439/859 |
| 6,921,292 B2 * | 7/2005 | Miyazaki | 439/564 |
| 7,041,907 B2 * | 5/2006 | Miyazaki | 174/72 A |
| 7,059,918 B2 * | 6/2006 | Matsumoto et al. | 439/752 |
| 7,094,098 B2 * | 8/2006 | Miyazaki | 439/559 |
| 7,097,498 B2 * | 8/2006 | Miyazaki | 439/559 |
| 7,101,217 B2 * | 9/2006 | Hayashi | 439/447 |
| 7,264,506 B2 * | 9/2007 | Mori et al. | 439/606 |
| 7,306,475 B2 * | 12/2007 | Tsuruta et al. | 439/364 |
| 7,572,150 B2 * | 8/2009 | Matsuoka | 439/626 |
| 7,597,589 B2 * | 10/2009 | Kawamura | 439/595 |
| 7,704,105 B2 * | 4/2010 | Bitz et al. | 439/810 |
| 7,811,116 B2 * | 10/2010 | Sakakura et al. | 439/364 |
| 7,828,591 B2 * | 11/2010 | Matsuoka | 439/559 |
| 7,959,469 B2 * | 6/2011 | Kawamura et al. | 439/607.55 |
| 7,980,903 B2 * | 7/2011 | Bitz et al. | 439/813 |
| 7,988,475 B2 * | 8/2011 | Sakakura | 439/271 |
| 8,152,574 B2 * | 4/2012 | Matsuoka et al. | 439/801 |
| 8,177,584 B2 * | 5/2012 | Matsuoka | 439/587 |
| 8,187,030 B2 * | 5/2012 | Matsuoka et al. | 439/542 |
| 8,192,238 B2 * | 6/2012 | Majewski | 439/813 |
| 8,257,096 B2 * | 9/2012 | Matsuoka et al. | 439/76.2 |
| 8,317,544 B2 * | 11/2012 | Matsuoka et al. | 439/607.55 |
| 8,342,880 B2 * | 1/2013 | Kato et al. | 439/595 |
| 2003/0207607 A1 * | 11/2003 | Matsumoto et al. | 439/357 |
| 2004/0106325 A1 * | 6/2004 | Miyazaki | 439/607 |
| 2004/0235364 A1 * | 11/2004 | Matsumoto et al. | 439/752 |
| 2006/0063412 A1 * | 3/2006 | Matsumoto et al. | 439/274 |
| 2007/0105427 A1 * | 5/2007 | Mori et al. | 439/364 |
| 2007/0207652 A1 | 9/2007 | Tsuruta | |
| 2009/0029594 A1 * | 1/2009 | Matsuoka | 439/626 |
| 2009/0053927 A1 * | 2/2009 | Bitz et al. | 439/556 |
| 2009/0124121 A1 * | 5/2009 | Matsuoka | 439/550 |
| 2010/0009566 A1 * | 1/2010 | Sakakura et al. | 439/364 |
| 2010/0216323 A1 * | 8/2010 | Kawamura et al. | 439/95 |
| 2010/0227513 A1 * | 9/2010 | Bitz et al. | 439/813 |
| 2010/0255728 A1 * | 10/2010 | Matsuoka et al. | 439/607.55 |
| 2010/0261363 A1 * | 10/2010 | Sakakura | 439/271 |
| 2010/0261364 A1 * | 10/2010 | Matsuoka | 439/271 |
| 2011/0014822 A1 * | 1/2011 | Kato et al. | 439/733.1 |
| 2011/0104924 A1 * | 5/2011 | Matsuoka et al. | 439/271 |
| 2011/0117784 A1 * | 5/2011 | Matsuoka et al. | 439/626 |
| 2012/0021632 A1 * | 1/2012 | Matsumoto et al. | 439/271 |
| 2012/0164867 A1 * | 6/2012 | Matsumoto et al. | 439/345 |
| 2012/0178291 A1 * | 7/2012 | Matsumoto et al. | 439/588 |
| 2012/0208404 A1 * | 8/2012 | Matsumoto et al. | 439/661 |
| 2012/0238147 A1 * | 9/2012 | Matsumoto et al. | 439/660 |

FOREIGN PATENT DOCUMENTS

| | | |
|---|---|---|
| JP | 2006031962 A | 2/2006 |
| JP | 2007-234561 A | 9/2007 |
| JP | 2008-218094 A | 9/2008 |
| JP | 2009129811 A | 6/2009 |
| JP | 2009-170357 | 7/2009 |
| JP | 2009-211976 A | 9/2009 |
| WO | WO-2008141458 A1 | 11/2008 |

OTHER PUBLICATIONS

The extended European search report dated Jun. 6, 2013, for corresponding European Patent Application No. 10835913.4.
Chinese Office Action dated Oct. 24, 2013 for corresponding Chinese Patent Application No. 201080028691.6.

* cited by examiner

CONNECTOR ASSEMBLY

TECHNICAL FIELD

The present invention relates to a connector assembly including a connector having a terminal and a connector housing for receiving the terminal, and a connector receptacle having a case with an insertion hole for accepting entry of the connector and a terminal portion to be connected with the terminal received in the insertion hole.

RELATED ART

A motor vehicle includes a variety of electronic devices. A hybrid car or an electric car includes, for example, a three-phase current motor and an inverter to invert a direct current power of a battery to an alternating current power. It is known that a connector assembly is utilized for connection between the motor and the inverter. The connector connected to the motor with an electrical wire is attached to a connector receptacle of the inverter (see, JP H11-126661 A).

A connector assembly of JP H11-126661 A includes a connector (an assembly of connection terminals) and a connector receptacle. The connector has a terminal and a connector housing receiving the terminal. The terminal has a hole to accept a bolt.

The connector receptacle has a box shaped case with an insertion hole to accept entry of the connector, and a terminal portion to be superposed with the terminal when the connector is positioned in the insertion hole. The terminal portion has a second hole to be communicated with the hole of the terminal. The insertion hole is disposed on a side surface of the case. The case has a fastening hole at an upper surface. The fastening hole communicates with the insertion hole and accepts a bolt (fastening member) to fasten the terminal and the terminal portion together.

The connector assembly is assembled with the connector and the connector receptacle as follows. The connector is approached to the side surface of the case and inserted into the insertion hole. The terminal is superposed on the terminal portion to communicate the hole and the second hole one another. The bolt is then inserted from the upper surface of the case through the fastening hole into the communicated hole and the second hole so that the terminal and the terminal portion are fastened with the bolt.

In the conventional connector assembly, the connector is inserted into the insertion hole of the connector receptacle from the side surface of the case, and the fastening member is inserted from the upper surface of the case through the fastening hole to fasten the terminal and the terminal portion. It is thus necessary for the case to have an insertion space at the side surface to accept entry of the connector and a fastening area at the upper surface of the case to accept entry of the fastening member.

The necessity of the attachment spaces (insertion space and fastening area) limits an effective use of a limited space in the car.

DISCLOSURE OF THE INVENTION

An object of the present invention is to provide a connector assembly permitting attachment of a connector to a connector receptacle in a reduced space.

According to a first aspect of the present invention, a connector assembly comprises: a connector including a terminal and a connector housing for receiving the terminal; a connector receptacle including a case having an insertion hole for accepting entry of the connector, and a terminal portion received in the insertion hole and to be connected with the terminal; and a fastening member for fastening the connector and the connector receptacle together, wherein the terminal has an electrical connection portion to be connected with an electrical wire, and an electrical contact portion upstanding from the electrical connection portion and having a hole, the connector housing includes a housing main body for receiving the electrical connection portion, and a column portion connected to the housing main body and having the central axis along an insertion direction of the connector, and for receiving the electrical contact portion with the hole disposed along the insertion direction, the terminal portion has a connection portion with a second hole to be communicated with the hole when the electrical contact portion is superposed on the connection portion, the case includes a case main body having the insertion hole, and a housing portion attached to the case main body and supporting the connection portion so that the second hole is aligned with the insertion direction, and wherein when the connector is positioned inside of the insertion hole of the connector receptacle, and the electrical contact portion is superposed on the connection portion, the fastening member is insertable from the opening of the column portion into the communicated hole and the second hole, and is capable of fastening the electrical contact portion and the connection portion together.

Preferably, the case main body has a bolt insertion hole at an upper portion facing the connector to be inserted, the connector has a first fixing portion to be superposed on the upper portion of the case main body of the connector receptacle, and a first bolt hole formed through in the first fixing portion and to be communicated with the bolt insertion hole, and the connector assembly further comprises a cover, wherein the cover has a cover main body for covering the opening of the column portion, a second fixing portion connected to the cover main body and to be superposed on the first fixing portion, and a second bolt hole formed through in the second fixing potion and to be communicated with the first bolt hole.

Preferably, the connector assembly further comprises a protector having a protector main body for covering the electrical wire connected to the electrical connection portion, a third fixing portion connected to the protector main body and to be superposed on the second fixing portion, and a third bolt hole formed through in the third fixing portion and to be communicated with the second bolt hole.

Preferably, the connector is made of a metal plate, and has the first fixing portion, the first bolt hole, and a shielding shell covering the connector housing, the shielding shell including a flat plate portion parallel to the upper portion of the case main body, a vertical portion upstanding from the flat plate portion along the insertion direction of the connector and having a curved portion between itself and the flat plate portion, and an indent projecting toward the upper portion of the case main body from a portion positioned between the flat plate portion and the curved portion and having a flat surface facing the upper portion of the case main body to be intimately contacted with the case main body.

Preferably, the vertical portion is disposed distant from the first fixing portion.

BEST MODE FOR CARRYING OUT THE INVENTION

Figure 1:
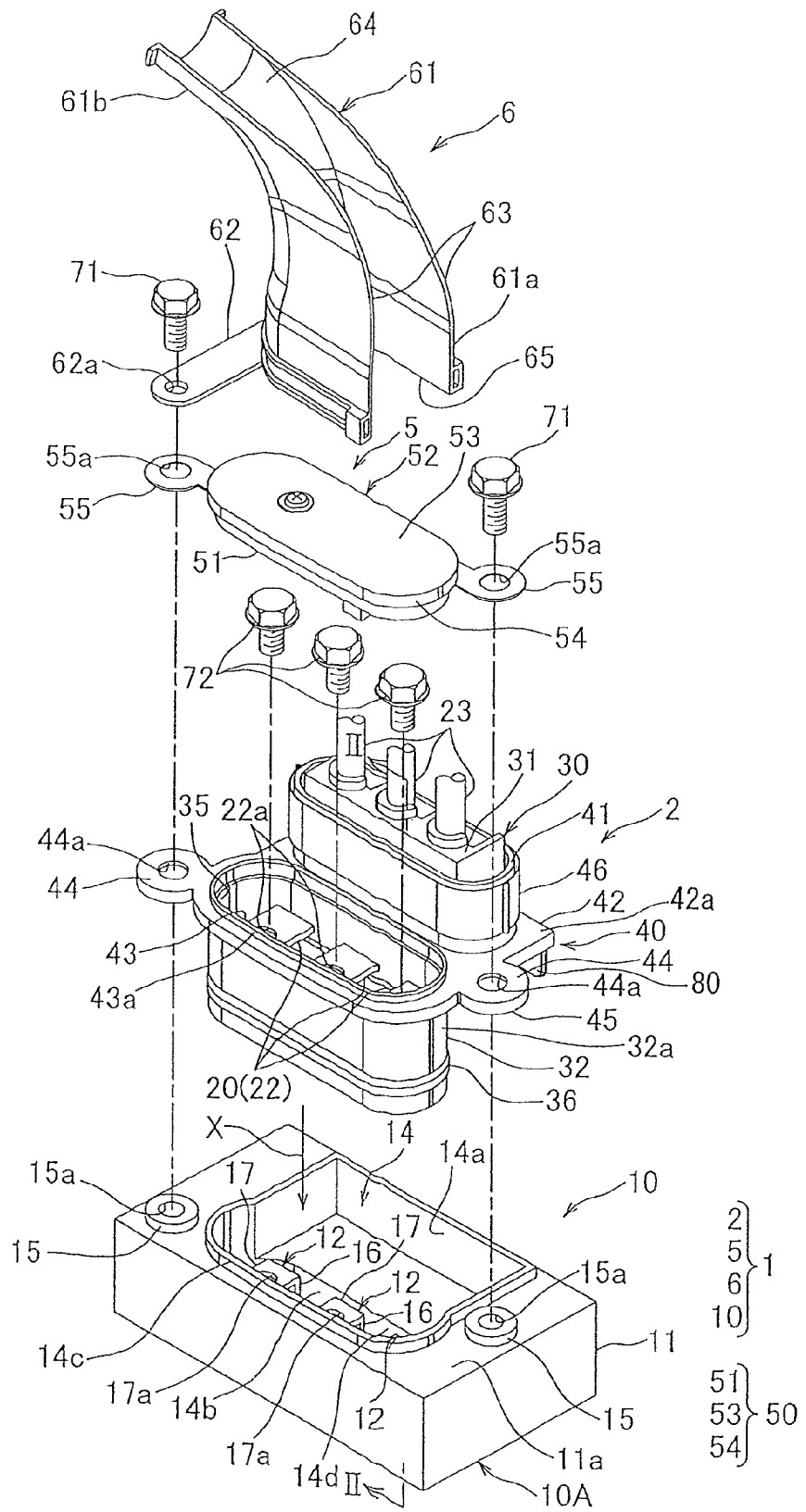
FIG. 1 is an exploded perspective view of an embodiment of a connector assembly of the present invention.
Figure 5:
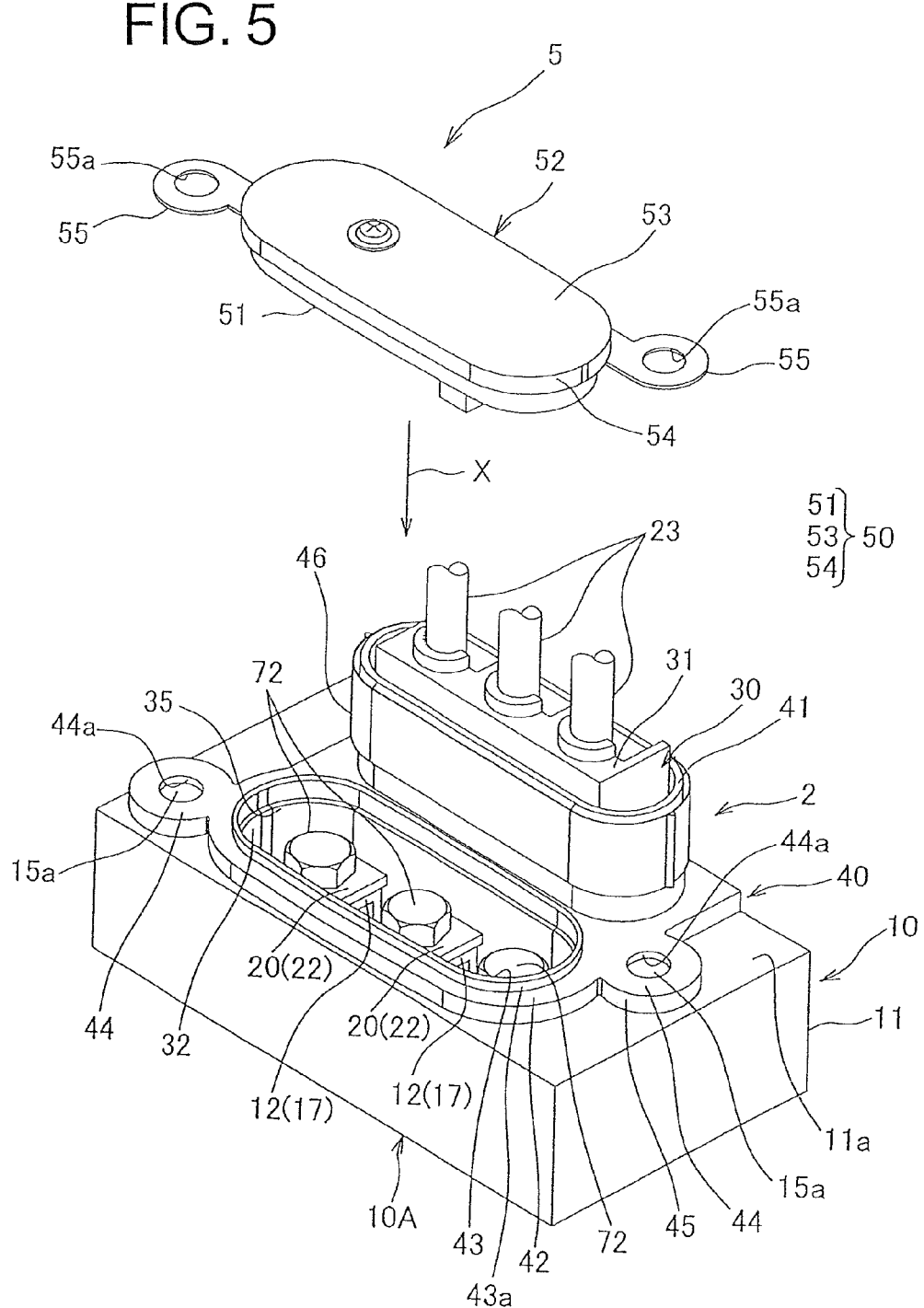
FIG. 5 is a perspective view showing the connector of FIG. 4 facing a cover.
Figure 6:
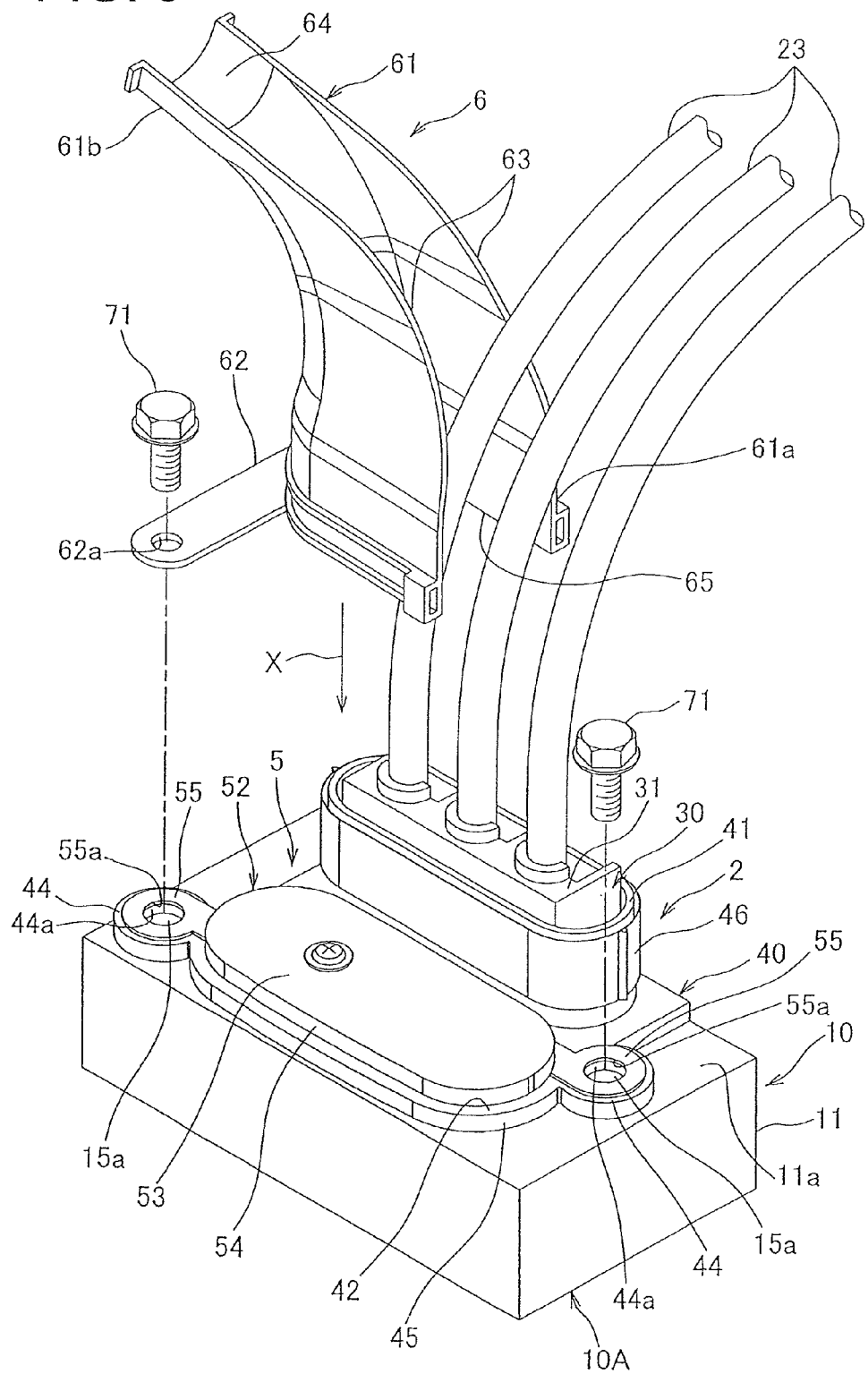
FIG. 6 is a perspective view showing the cover attached to the connector of FIG. 5.
Figure 7:
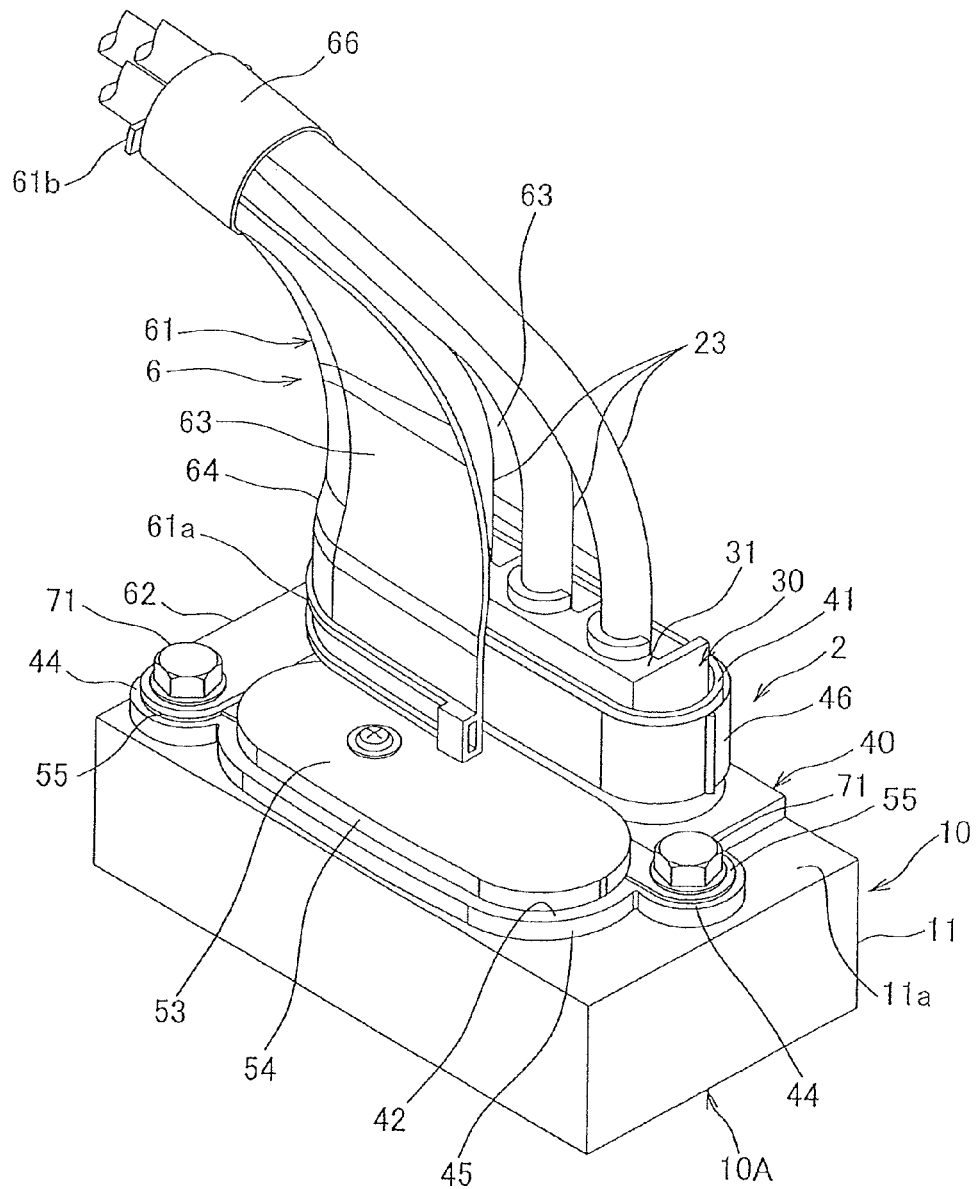
FIG. 7 is a perspective view showing the connector, the cover and the protector of FIG. 6 attached to a connector receptacle.

FIGS. 1-7 illustrate an embodiment of a connector assembly 1 of the present invention. The connector assembly 1 has a structure connecting between a connector 2, which is connected to a three-phase current motor mounted on a hybrid car or an electric car with an electrical wire 23, and a connector receptacle 10 of an inverter (FIG. 7). Referring to FIG. 1, the connector assembly 1 includes the connector receptacle 10, the connector 2, bolts 71, bolts (fastening members) 72, a cover 5 and a protector 6.

Figure 2:
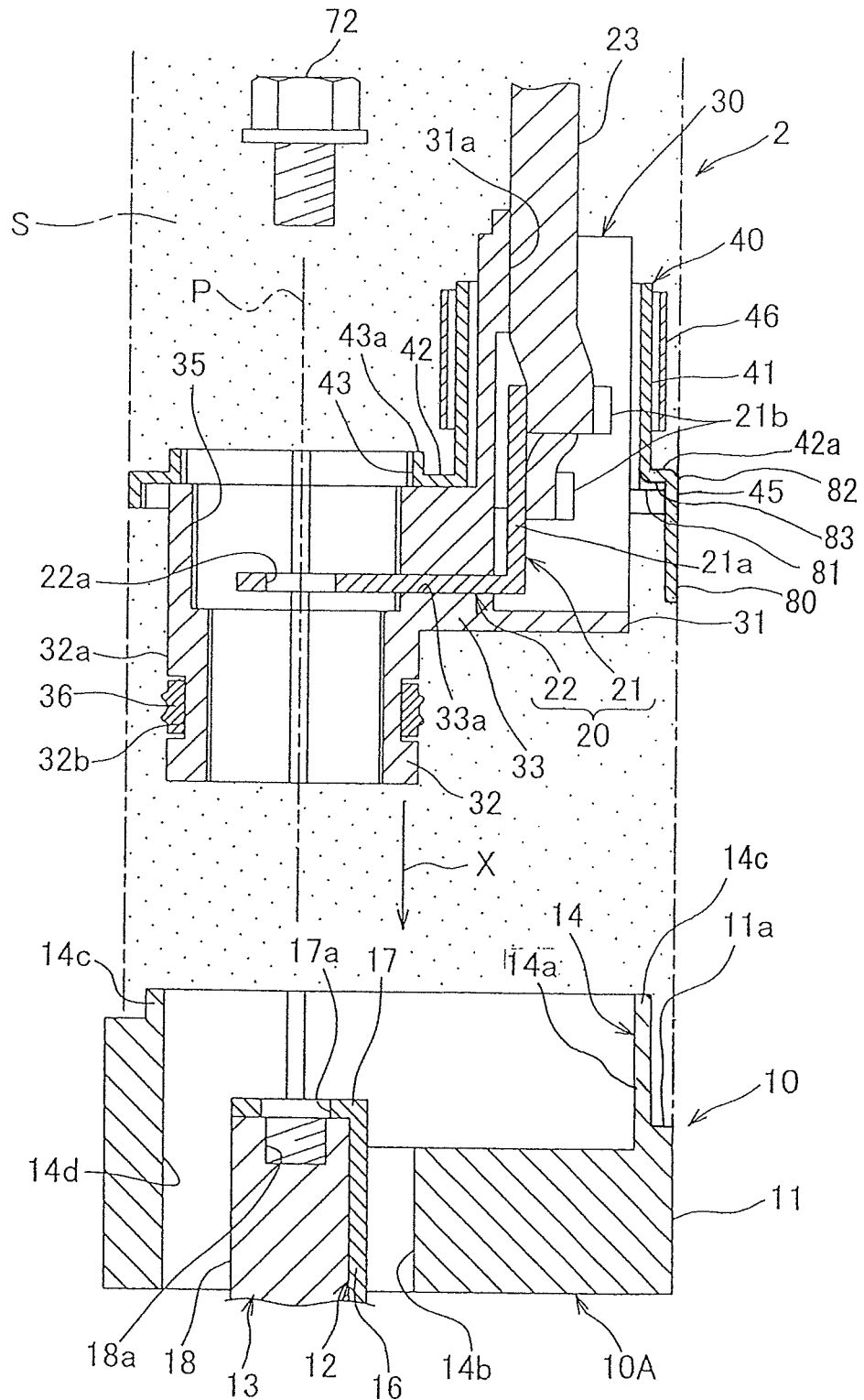
FIG. 2 is a sectional view taken along II-II line of FIG. 1.

The connector receptacle 10 is disposed on a surface of the inverter and includes a case 10A and terminal portions 12 as shown in FIG. 2. The case 10A is made of a conductive metal material and has a box shape, and includes a case main body 11 and a housing portion 13. The case main body 11 includes an insertion hole 14 to accept entry of the connector 2, and projections 15 having bolt insertion holes 15a to accept the bolts 71 to fasten the connector 2.

The insertion hole 14 opens toward an upper portion (surface) 11a of the case main body 11 as shown in FIG. 1. The insertion hole 14 includes a large portion 14a, which is disposed adjacent to the upper portion 11a and has a periphery similar to a periphery of the central portion (flat plate portion 42) of the connector 2, and a small portion 14b, which is disposed opposite the upper portion 11a and has a periphery similar to a periphery of an end portion (column portion 32) of the connector 2. The insertion hole 14 has an upstanding piece 14c at the periphery thereof.

The projections 15 have a cylindrical shape and a height same as that of the upstanding piece 14c from the upper portion 11a. The projections 15 are disposed opposite one another with respect to the insertion hole 14. The bolt insertion holes 15a are formed inside of the projections 15 and have thread grooves to accept the bolts 71 for securing the connector 2, the cover 6 and the protector 6 together.

The terminal portions 12 are press-formed from a metal plate. A plurality of the terminal portions 12 (three in the embodiment) are disposed spaced each other in the insertion hole 14 and supported with the housing portion 13. The terminal portions 12 have an L-shape (FIG. 2) and each integrally include a device connection portion 16 to be connected to an electrical component of the inverter and a connection portion 17 to be connected with the connector 2. Each device connection portion 16 has a flat shape and is disposed along the insertion direction X of the connector 2.

The connector portions 17 of the terminal portions 12 each have a flat plate shape and intersect the device connection portion 16 and are positioned in flush with each other. As described later, when the connector 2 is positioned in the insertion hole 14 of the connector receptacle 10, the connection portions 17 are positioned in the column portion 32 and contact electrical contact portions 22 of terminals 20 of the connector 2. The connection portions 17 each have a second hole 17a to be communicated with a hole 22a of the electrical contact portion 22.

The each housing portion 13 is made of an insulation synthetic resin, and includes a terminal port 18 positioned inside of the insertion hole 14 and supporting the terminal portion 12, and a attachment piece (not shown) connected to the terminal port 18 and secured to the case main body 11 with a bolt. The each terminal port 18 has a flat top surface onto which the connection portion 17 is superposed. The connection portion 17 is disposed on the flat top surface of the terminal port 18 and positioned perpendicular to the insertion direction X of the connector 2. The connector portion 17 has the second hole 17a oriented to the insertion direction X of the connector 2.

The each terminal port 18 has a bolt insertion hole 18a at a top portion thereof to accept the bolt 72, which secures the terminal portion 12 and the terminal 20 of the connector 2. The bolt insertion hole 18a has a thread groove and is positioned on the top surface of the terminal port 18 to be communicated with the second hole 17a of the connection portion 17.

The connector 2 is a shielding connector and includes the terminals 20, a connector housing 30, a seal member 36, a shielding shell 40 and a shielding ring 46.

The connector 2 includes a plurality of the terminals 20 (three in the embodiment) which are press-formed from a metal plate. Referring to FIG. 2, the terminals 20 have an L shape and each integrally have an electrical wire connection portion 21 connected to the electrical wire 23 and the electrical contact portion 22 to be connected to the terminal portion 12 of the connector receptacle 10.

The electrical wires 23 each include a conductive core wire and an insulation sheath covering the core wire. The sheath is removed at an end portion of each electrical wire 23. The electrical wires 23 of FIGS. 6-7 are depicted with a longer size than that of FIGS. 1-5.

The electrical wire connection portions 21 each have a flat plate portion 21a and a plurality of crimping pieces 21b connected to the flat plate portion 21a. The core wire and the sheath of the electrical wire 23 are positioned in the electrical wire connection portion 21 and crimped with the crimping pieces 21b.

Each of the electrical contact portions 22 is a flat plate perpendicularly upstanding from an end of the flat plate portion 21a and has the hole 22a to accept the fastening member (bolt) 72. The flat plates of the electrical contact portions 22 are positioned crosswise with respect to the insertion direction X of the connector 2 and placed separately flush one another.

Figure 3:
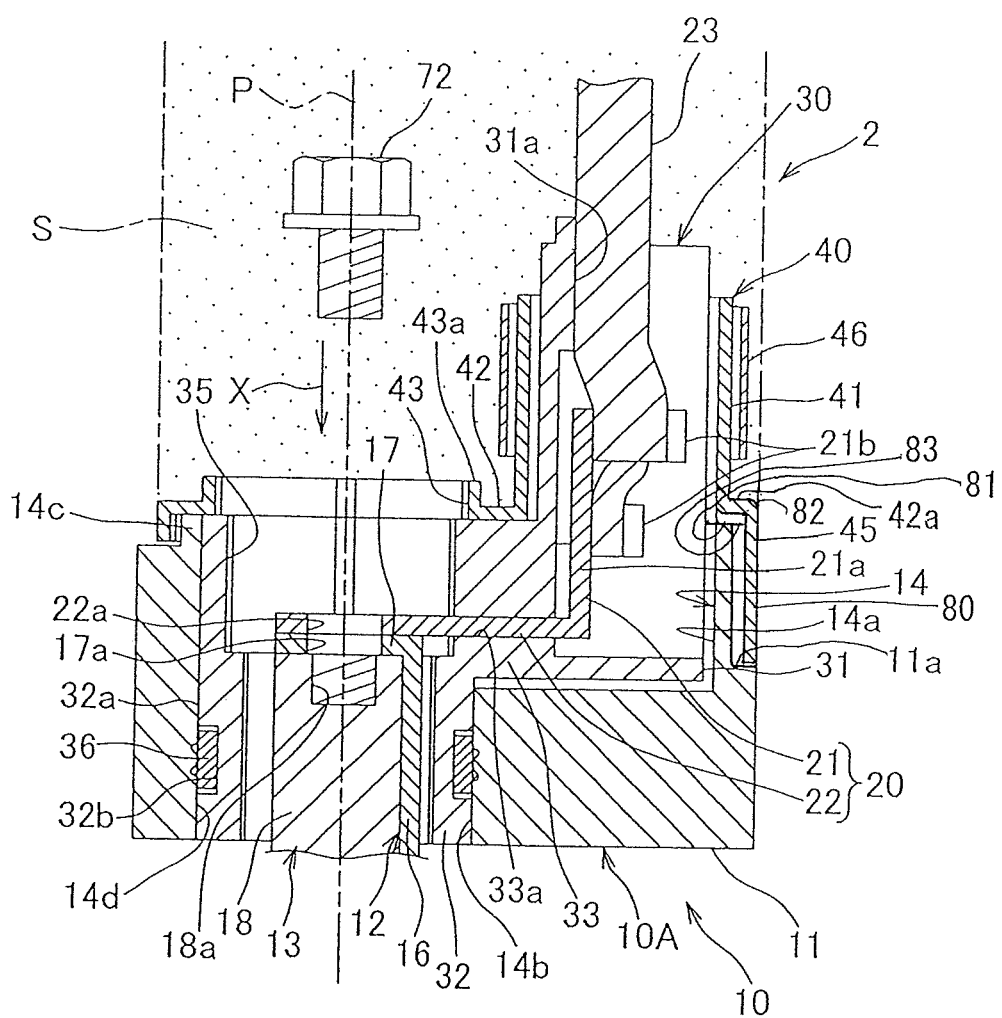
FIG. 3 is a sectional view showing a connector of FIG. 2 inserted into an insertion hole.
Figure 4:
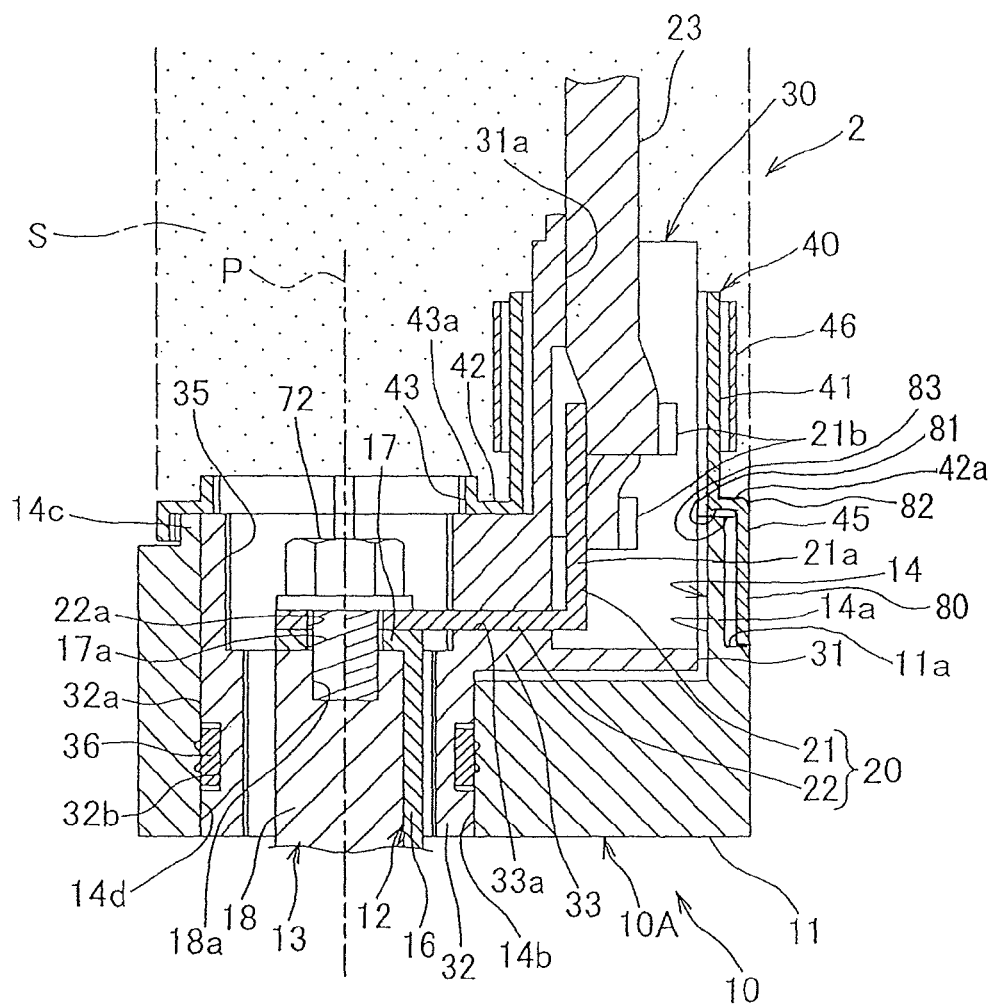
FIG. 4 is a sectional view showing a terminal and a terminal portion of FIG. 3 fastened together with a bolt.

When the connector 2 is inserted into the insertion hole 14, the electrical contact portions 22 are superposed on the connection portions 17 of the connector receptacle 10 and the holes 22a of the electrical contact portions 22 are communicated with the second holes 17a of the connection portions 17 of the connector receptacle 10 (refer to FIG. 3). The bolts 72 are then inserted into the holes 22a and the second holes 17a toward the connector receptacle 10 along the insertion direction X, and screwed into the bolt insertion holes 18a. Referring to FIG. 4, the electrical contact portions 22 and the connection portions 17 are fastened together with the fastening members 72 so that the terminals 20 and the terminal portions 12 are electrically and mechanically connected together.

The connector housing 30 is made of an insulation synthetic resin and includes a housing main body 31, the column portion 32 and a link portion 33 connecting the housing main body 21 and the column portion 32. The housing main body 31 has a flat box shape and three terminal receptacles 31a to receive the electrical wire connection portions 21 of the terminals 20 (FIGS. 2-4 show only one terminal receptacle).

The terminal receptacles 31a are disposed apart from the link portion 33 of the housing main body 31 and each have a groove with respect to an upper surface of the housing main body 31 (refer to FIG. 2). The terminal receptacles 31a are arranged parallel separately each other from the upper surface of the housing main body 31. The connector 2 is inserted into the insertion hole 14 along a longitudinal direction of the terminal receptacles 31a indicated by the arrow X in FIG. 2.

The central axis P, which is indicated by a chain double-dashed line in FIG. 2, of the column portion 32 is parallel to the longitudinal direction of the terminal receptacles 31a and is connected to the housing main body 31 with the link portion 33. The central axis P is thus parallel to the insertion direction X of the connector 2. End portions of the electrical contact portions 22 project inwardly of the column portion 32. The electrical contact portions 22 are disposed crosswise of the insertion direction X of the connector 2 and the holes 22a of the electrical contact portions 22 are oriented to the insertion direction X of the connector 2.

The link portion 33 has a box shape and interconnects a side portion of the column portion 32 and an outer surface of the housing main body 31. The link portion 33 has holes 33a to accept base portions of the electrical contact portions 22. Accordingly, the electrical wire connection portions 21 of the terminals 20 are received in the terminal receptacles 31a and the electrical contact portions 22 project inwardly of the column 32 through the holes 33a.

The seal member 36 is made of a resilient material such as rubber and has a ring shape. The seal member 36 is disposed in a groove 32b formed around a lower portion of an outer surface 32a of the column portion 32. When the connector 2 is inserted into the insertion hole 14, the seal member 36 keeps watertight between the connector 2 and the connector receptacle 10.

Figure 8:
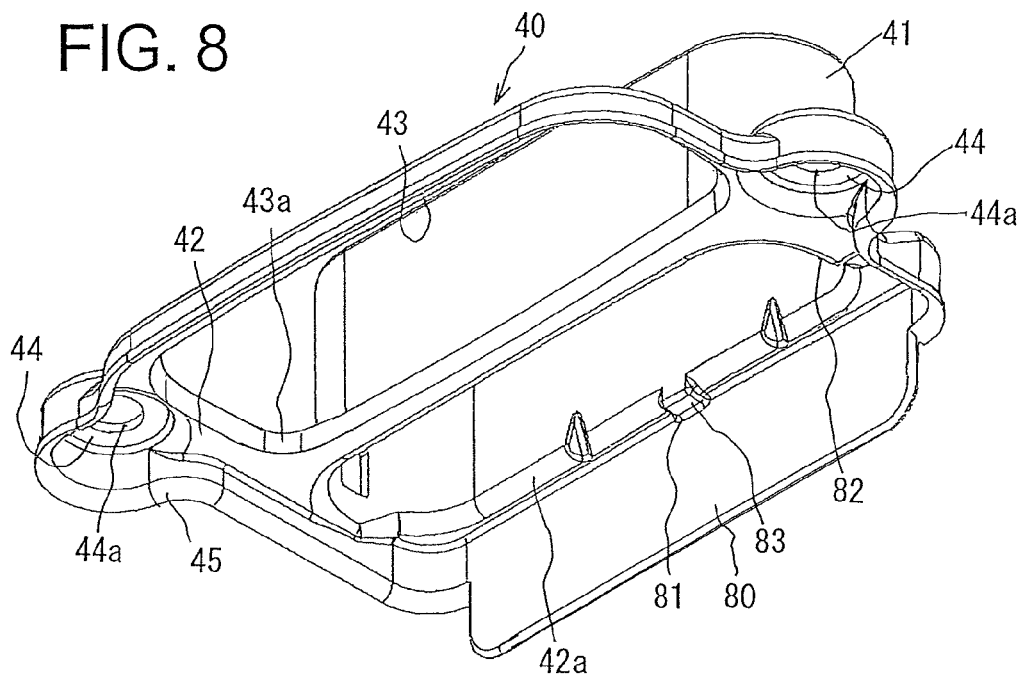
FIG. 8 is a perspective view of a shielding shell of the connector of FIG. 1.

The shielding shell 40 is made of a conductive metal plate. Referring to FIG. 8, the shielding shell 40 integrally includes a column portion 41, which is disposed around an upper portion of the housing main body 31, and the flat portion 42, which is connected to the column portion 41 and superposed on end surfaces of the column portion 32 and the link portion 33. The column portion 41 of the shielding shell 40 covers the outer periphery of the upper portion of the housing main body 31 of the connector housing 30.

The flat plate portion 42 is disposed parallel to the upper portion 11a of the case main body 11. The flat plate 42 has a size larger than the insertion hole 14 and has a hole 43, which is an opening of the column portion 32. A periphery of the hole 43 has an upstanding piece 43a around thereof and a pair of projecting first fixing portions 44.

The first fixing portions 44 are oppositely disposed one another with respect to the hole 43 and positioned to be aligned with the projections 15 of the connector receptacle 10. The pair of the first fixing portions 44 project outwardly of the flat plate portion 42 and are disposed perpendicular to the insertion direction X of the connector 2. The first fixing portions 44 each have a first bolt hole 44a to be communicated with the bolt insertion hole 15a of the connector receptacle 10. Peripheries of the first fixing portions 44 and the flat plate portion 42 have an upstanding piece 45.

When the connector 2 is inserted into the insertion hole 14, the first fixing portions 44 are superposed on the projections 15 so that the first bolt holes 44a communicate with the bolt insertion holes 15a.

The shielding shell 40 integrally has a vertical portion 80 and an indent 81 as shown in FIG. 8. The vertical portion 80 has a plate shape, and is disposed parallel to the insertion direction X of the connector 2 and connected to a portion 42a positioned spaced from the first fixing portions 44 of the flat plate portion 42. The portion 42a is connected to a curved portion 82 described later. The vertical portion 80 is thus upstanding from the portion 42a toward the case main body 11 along the insertion direction X of the connector 2. The curved portion 82 with a circular section is thus positioned between the vertical portion 80 and the portion 42a.

Figure 9:
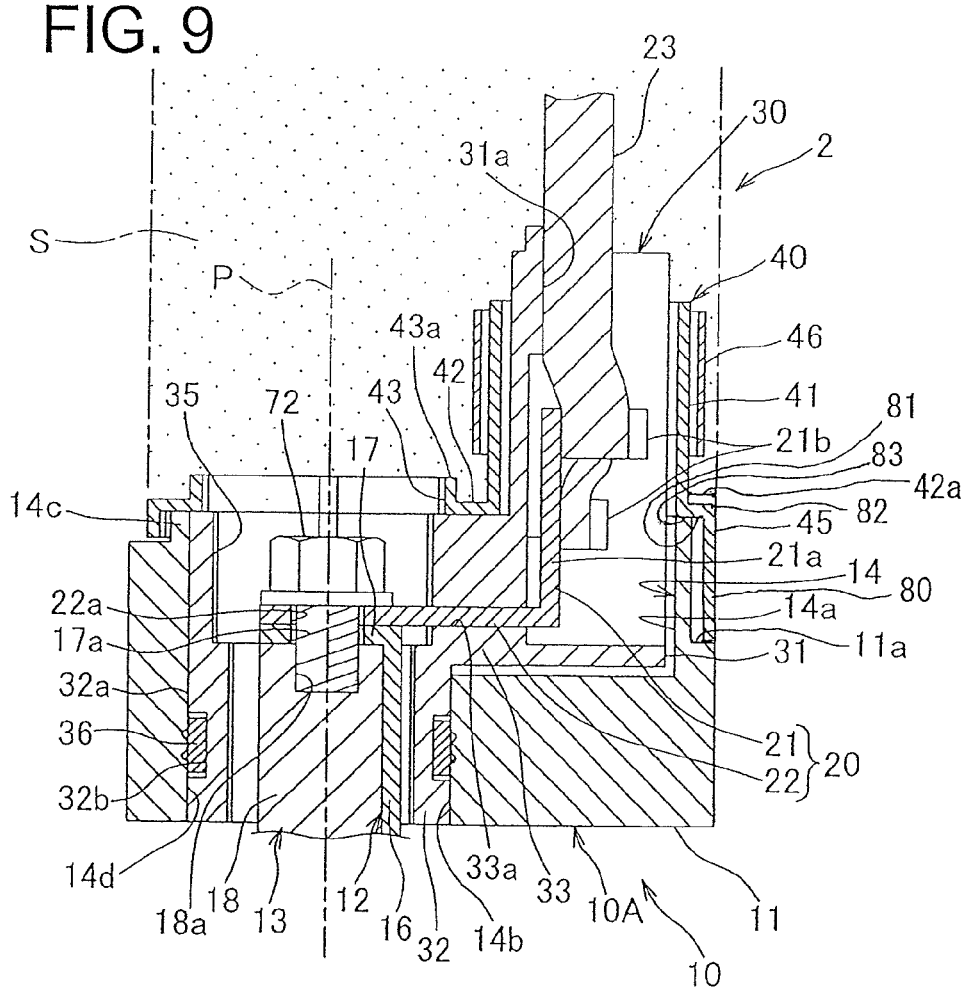
FIG. 9 is a sectional view of an essential portion of the connector of FIG. 4.

As shown in FIG. 8, the indent 81 projects from the portion 42a of the flat plate portion 42 toward the upper portion 11a of the case main body 11 along the insertion direction X of the connector 2. The indent 81 has a flat surface 83 facing the upper portion 11a of the case main body 11. Referring to FIG. 9, the indent 81 intimately contacts the upstanding piece 14c of the case main body 11 when the connector 2 is attached to the case 10A or the shielding shell 40 is attached to the case main body 11.

The shielding ring 46 is made of a conductive metal and has a circular shape. The shielding ring 46 is disposed around the column portion 41 of the shielding shell 40 and crimped toward the column portion 41 (drawings show the shielding ring 46 prior to crimping). The shielding ring 46 and the column portion 41 include a shielding member (not shown), for example braided wire, covering the electrical wires 23 therebetween.

Referring to FIG. 5, the cover 5 has a cover housing 51 made of an insulation synthetic resin, and a shielding portion 52 made of a conductive metal. The cover housing 51 and the shielding portion 52 are fixed together with a bolt. The cover housing 51 is a thick plate and has a shape insertable in the column portion 32. The cover housing 51 has a seal member (not shown) around itself. The seal member keeps watertight between the cover housing 51 and the column portion 32.

The shielding portion 52 includes a plate portion 53, which is formed in a size larger than the cover housing 51 in a plan view, an upstanding piece 54, which is disposed around the plate portion 53 and upstanding toward the cover housing 51, and a pair of second fixing portions 55, which project from the upstanding piece 54 outwardly of the plate portion 53.

The second fixing portions 55 are disposed opposite with respect to the plate portion 53 to be aligned with the first fixing portions 44. The second fixing portions 55 project oppositely outwardly of the plate portion 53 one another, and each have a second bolt hole 55a at the central portion thereof.

When the cover 5 is covered on the connector 2, as shown in FIG. 6, the cover housing 51, the plate portion 53 and the upstanding piece 54 cover an opening 35 to prevent the connection portions of the terminal portions 12 and the terminals 20 from being exposed outside. The cover housing 51, the plate portion 53 and the upstanding piece 54 configure a cover main body 50. The second fixing portions 55 are superposed on the first fixing portions 44 of the connector 2, and the second bolt holes 55a, the first bolt holes 44a and the bolt insertion holes 15a are communicated together.

The protector 6 is made of a hard insulation synthetic resin (refer to FIG. 6), and has a protector main body 61 to cover the electrical wires 23 and a third fixing portion 62 connected to the protector main body 61. The protector main body 61 is formed in a U-shape and has a pair of side plates 63 and a connection plate 64 connecting the side plates 63 together.

The protector main body 61 has one opening 65 at one end portion 61a and another opening at another end portion 61b. The one opening 65 has a size larger than that of the another opening. The opening 65 surrounds a part of the crimped shielding ring 46 of the connector 2. The third fixing portion 62 has a plate shape and is connected to an end portion of the connection plate 64 forming the opening 65. The third fixing portion 62 has a third bolt hole 62a at a tip portion.

Referring to FIG. 7, the one end portion 61a of the protector main body 61 covers the outer surface of the shielding ring 46 of the connector 2. The electrical wires 23 guided out of the connector 2 are positioned inside of the protector main body 61 and guided toward the other end portion 61b. The electrical wires 23 and the other end portion 61b are wound together with a tape 66. An end portion of the third fixing portion 62 is superposed on the second fixing portion 55, and the third bolt hole 62a communicates with the second bolt hole 55a of the cover 5, the first bolt hole 44a of the connector 2 and the bolt insertion hole 15a of the connector receptacle 10.

The connector assembly 1 is assembled with attachment of the connector 2, the cover 5 and the protector 6 to the connector receptacle 10. Referring to FIG. 2, the connector 2 is inserted into the insertion hole 14 of the connector receptacle 10 along the direction X within an attachment space S indicated by dots intervened by two chain lines.

Referring to FIG. 3, the terminal portions 12 of the connector receptacle 10 are positioned inside of the column portion 32 of the connector 2. The electrical contact portions 22 of the terminals 20 of the connector 2 are superposed on the connection portions 17 of the terminal portions 12 of the connector receptacle 10. The holes 22a of the electrical contact portions 22 communicate with the second holes 17a of the connection portions 17. The fastening members 72 are inserted into the holes 22a and the second holes 17a from the opening 35 of the column portion 32 along the direction X, and inserted into the housing portions 13. Referring to FIG. 4, the electrical contact portions 22 and the connection portions 17 are secured with the fastening members 72 in the direction X.

When the connector 2 is inserted in the insertion hole 14, the outer periphery of the flat plate portion 42 of the shielding shell 40 is superposed on the upstanding piece 14c of the connector receptacle 10. The upstanding piece 45 of the shielding shell 40 encircles the upstanding piece 14c and the projections 15. The first fixing portions 44 of the shielding shell 40 are superposed on the projections 15 and the first bolt holes 44a communicate with the bolt insertion holes 15a. The opening 35 of the column portion 32 is then covered with the cover 5 in order that the cover housing 51 is inserted into the column portion 32. The outer periphery of the plate portion 53 is superposed on the upstanding piece 43a of the shielding shell 40 and the upstanding piece 54 of the cover 5 encircles the upstanding piece 43a of the column portion 32. As shown in FIG. 6, the second fixing portions 55 are superposed on the first fixing portions 44 of the connector 2 and the second bolt holes 55a communicate with the first bolt holes 44a and the bolt insertion holes 15a.

Referring to FIG. 6, the electrical wires 23 are then covered with movement of the protector 6 in the direction X or sliding thereof from left to right so that the one end portion 61a of the protector main body 61 covers the outer periphery of the shielding ring 46 of the connector 2. The end portion of the third fixing portion 62 is superposed on the one second fixing portion 55, and the third bolt hole 62a communicates with the one bolt hole 44a and the one bolt insertion hole 15a.

Referring to FIG. 7, the one bolt 71 is inserted into the third bolt hole 62a, the second bolt hole 55a, the first bolt hole 44a and the bolt insertion hole 15a, and the other bolt 71 is inserted into the second bolt hole 55a, the first bolt hole 44a and the bolt insertion hole 15a so that the connector 2, the cover 5 and the protector 6 are secured to the connector receptacle 10 with the bolts 71. The electrical wires 23 are arranged inside of the protector main body 61, and the other end portion 61b of the protector main body 61 and the electrical wires 23 are wound together with the tape 66.

Assembly of the connector 2, the cover 5 and the connector receptacle 10 removes electrical noise from the electrical wires 23 or incoming noise with a ground through the shielding member of the electrical wires 23, the shielding shell 40 and the case main body 11. The electrical noise from the electrical contact portions 22 and the connection portions 17 or the incoming noise is ground to the earth through the shielding portion 52 of the cover 5, the shielding shell 40 and the case main body 11 in order. The connector assembly 1 of the present invention has the shielding characteristic and is especially useful for the connection between the motor and the inverter, where the high voltage is applied.

According to the embodiment of the present invention, the insertion direction X of the connector 2 is same as the fastening direction of the terminals 20 and the terminal portions 12. Thereby, the configuration of the present invention allows the insertion of the connector 2 through the attachment space S so that the terminals 20 and the terminal portions 12 are fastened together with the fastening members 72. The attachment space S, which is necessary to attach the connector 2 to the connector receptacle 10, is thus smaller.

The conventional connector receptacle 10 includes bolt holes to fasten the terminals 20 and the terminal portions together. The connector receptacle 10 of the present invention has a simplified structure and the case main body 11 made of the metal can be formed with a low cost.

When the first fixing portions 44 and the second fixing portions 55 are superposed on the upper portion 11a of the case main body 11, the first bolt holes 44a and the second bolt holes 55a communicate with the bolt insertion holes 15a. Thereby, the connector 2 and the cover 5 are all together fixed to the connector receptacle 10 with the bolts 71, resulting in a simplified manufacturing process. The cover 5 is fixed within the attachment space S of the connector 2. The connector receptacle 10 of the present invention does not require the bolt insertion holes to fix the cover 5, and has the simplified structure resulting in the low product cost.

According to the embodiment of the present invention, the third bolt hole 62a, the second bolt hole 55a, the first bolt hole 44a and the bolt insertion hole 15a are communicated with together. Thereby, this configuration allows a single fastening work for fixing the connector 2, the cover 5 and the protector 6 to the connector receptacle with the bolts 71. The protector 6 is fixed to the connector 2 without use of a band, resulting in reduction of the number of components and of industrial waste.

According to the embodiment of the present invention, the first fixing portions 44 project crosswise of the insertion direction X of the connector 2. The fastening direction of the bolts 71 are thus same as the insertion direction X. The attachment space S can thus be smaller in size and the shielding shell 40 can be disposed close to the case main body 11, resulting in improvement of the shielding character.

According to the present invention, the seal member 36 encircles the outer surface 32a of the column portion 32 compared that the conventional seal member entirely encircles the outer surface of the connector housing 30, resulting in reduction of material cost. It is apparent that the groove 32b is disposed only around the column portion 32 compared that the conventional connector housing has the groove 32b entirely disposed around the connector housing 30, resulting in a miniaturization of the connector 2 and reduction of the attachment space S.

According to the present invention, the indent 81 is disposed on the portion 42a between the curved portion 82 and the flat plate portion 42 of the shielding shell 40 made of the metal plate. The indent 81 improves a rigidity of the shielding shell 40. The improved rigidity prevents a deformation of the shielding shell 40 when the connector 2 is fixed to the case main body 11 with the first fixing portions 44. The intimate contact between the flat surface 83 of the indent 81 and the case main body 11 thus achieves an assured electrical connection between the shielding shell 40 and the case main body 11.

According to the present invention, the indent 81 has the flat surface 83 parallel to the upper portion 11a of the case main body 11. The intimate contact between the flat surface 83 of the indent 81 and the case main body 11 achieves the assured electrical connection between the shielding shell 40 and the case main body 11 even though the curved portion 82 is disposed between the vertical portion 82 and the flat plate portion 42.

According to the present invention, both the vertical portion 82 and the indent 81 are disposed spaced from the first fixing portions 44. The indent 81 thus intimately contacts the case main body 81 even though the shielding shell 40 slightly deforms when the connector 2 is fixed to the case main body 11 with the first fixing portions 44. This arrangement provides the assured electrical connection between the shielding shell 40 and the case main body 11.

According to the embodiment of the present invention, the third fixing portion 62 of the protector 6 is superposed on the second fixing portion 55 of the cover 5 to achieve shielding character of the connector assembly 1. Unless the shielding character is required, the third fixing portion 62 may be superposed on the first fixing portion 44 of the connector 2 and the second fixing portion 55 is superposed on the third fixing portion 62. According to the present invention, the connector 2 connected to the motor is attached to the connector receptacle 10 of the inverter. It is apparent that the connector 2 connected to electronic devices other than the motor may be attached to the connector receptacle 10 other than the inverter.

The embodiment of the connector assembly of the present invention is only exemplary and not limited thereto. Any modification and alteration are within the scope of the invention.

INDUSTRIAL APPLICABILITY

The present invention has the following effects.

According to the present invention, the insertion direction of the connector is same as the fastening direction of the terminal and the terminal portion. Thereby, the connector receptacle provides only the attachment space over the insertion hole to accept entry of the connector so that the fastening member fastens the terminal and the terminal portion. This configuration allows reduction of the attachment space for accepting entry of the connector. It is unnecessary to dispose the fastening hole in the connector receptacle to fasten the terminal and the connection portion, resulting in the simplified connector receptacle.

According to the present invention, when the first fixing portion is superposed on the upper surface of the case main body and the second fixing portion is superposed on the first fixing portion, the bolt insertion hole, the first bolt hole and the second bolt hole communicate one another. Thereby, the connector and the cover are fixed to the connector receptacle at one time, resulting in a simplified assembling. The cover is fixed to the connector within the attachment space over the connector. It is unnecessary to dispose the hole in the connector receptacle to fix the cover, resulting in the simplified connector assembly and the reduction production cost.

According to the present invention, when the third fixing portion is superposed on the second fixing portion, the third bolt hole communicates with the bolt insertion hole, the first bolt hole and the second bolt hole. Thereby, the connector, the cover and the protector are fixed to the connector receptacle with the fastening member at one time, resulting in the simplified assembling. It is unnecessary to fix the protector to the connector with another member such as a binding tape, resulting in a reduction of components and industrial waste.

According to the present invention, the indent is disposed on the portion between the flat plate portion and the curved portion of the shielding shell made of the metal plate. Thereby, the indent improves a rigidity of the shielding shell. The improved rigidity prevents a deformation of the shielding shell when the connector is fixed to the case main body with the first fixing portions. The intimate contact between the flat surface of the indent and the case main body thus achieves the assured electrical connection between the shielding shell and the case main body. The indent has the flat surface parallel to the upper portion of the case main body. Thereby, the intimate contact between the flat surface of the indent and the case main body achieves the assured electrical connection between the shielding shell and the case main body even though the curved portion is disposed between the vertical portion and the flat plate portion.

According to the present invention, both the vertical portion and the indent are disposed spaced from the first fixing portions. Thereby, the indent thus intimately contacts the case main body even though the shielding shell slightly deforms when the connector is fixed to the case main body with the first fixing portions. This arrangement provides the assured electrical connection between the shielding shell and the case main body.

The invention claimed is:

1. A connector assembly comprising:
   a connector including a terminal and a connector housing for receiving the terminal;
   a connector receptacle including a case having an insertion hole for accepting entry of the connector, and a terminal portion received in the insertion hole and to be connected with the terminal; and
   a fastening member for fastening the connector and the connector receptacle together,
   wherein the terminal is an L shape and has an electrical connection portion to be connected with an electrical wire, and an electrical contact portion upstanding from the electrical connection portion and having a hole,
   the connector housing includes a housing main body for receiving the electrical connection portion, and a column portion connected to the housing main body and having an opening with the central axis along an insertion direction of the connector, and for receiving the electrical contact portion with the hole disposed along the insertion direction,
   the terminal portion has a connection portion with a second hole to be communicated with the hole when the electrical contact portion is superposed on the connection portion,
   the case includes a case main body having the insertion hole, and a housing portion attached to the case main body and supporting the connection portion so that the second hole is aligned with the insertion direction, wherein when the connector is positioned inside of the insertion hole of the connector receptacle, and the electrical contact portion is superposed on the connection portion, the fastening member is insertable from the opening of the column portion into the communicated hole and the second hole, and is capable of fastening the electrical contact portion and the connection portion together, and wherein the connection portion is disposed perpendicularly to the insertion direction of the connector.

2. The connector assembly as claimed in claim 1,
the case main body having a bolt insertion hole at an upper portion facing the connector to be inserted,
the connector having a first fixing portion to be superposed on the upper portion of the case main body of the connector receptacle, and a first bolt hole formed through in the first fixing portion and to be communicated with the bolt insertion hole, and
the connector assembly further comprising a cover,
wherein the cover has a cover main body for covering the opening of the column portion, a second fixing portion connected to the cover main body and to be superposed on the first fixing portion, and a second bolt hole formed through in the second fixing potion and to be communicated with the first bolt hole.

3. The connector assembly as claimed in claim 2, further comprising a protector having a protector main body for covering the electrical wire connected to the electrical connection portion, a third fixing portion connected to the protector main body and to be superposed on the second fixing portion, and a third bolt hole formed through in the third fixing portion and to be communicated with the second bolt hole.

4. The connector assembly as claimed in claim 3, wherein the connector is made of a metal plate, and has the first fixing portion, the first bolt hole, and a shielding shell covering the connector housing, the shielding shell including a flat plate portion parallel to the upper portion of the case main body, a vertical portion upstanding from the flat plate portion along the insertion direction of the connector and having a curved portion between itself and the flat plate portion, and an indent projecting toward the upper portion of the case main body from a portion positioned between the flat plate portion and the curved portion and having a flat surface facing the upper portion of the case main body to be intimately contacted with the case main body.

5. The connector as claimed in claim 4, wherein the vertical portion is disposed distant from the first fixing portion.

6. The connector assembly as claimed in claim 2, wherein the connector is made of a metal plate, and has the first fixing portion, the first bolt hole, and a shielding shell covering the connector housing, the shielding shell including a flat plate portion parallel to the upper portion of the case main body, a vertical portion upstanding from the flat plate portion along the insertion direction of the connector and having a curved portion between itself and the flat plate portion, and an indent projecting toward the upper portion of the case main body from a portion positioned between the flat plate portion and the curved portion and having a flat surface facing the upper portion of the case main body to be intimately contacted with the case main body.

7. The connector as claimed in claim 6, wherein the vertical portion is disposed distant from the first fixing portion.

8. The connector as claimed in claim 1, wherein the second hole is disposed at the center of the connection portion.

* * * * *